United States Patent [19]
Posner et al.

[11] Patent Number: 5,164,013
[45] Date of Patent: Nov. 17, 1992

[54] PROCESS FOR DRY MILLING OF WHEAT TO OBTAIN GLUTEN AND STARCH

[75] Inventors: Elieser S. Posner; Paul A. Seib, both of Manhattan; Qiang Zhuge, Independence, all of Kans.

[73] Assignee: Kansas State Univ. Research Foundation, Manhattan, Kans.

[21] Appl. No.: 676,376

[22] Filed: Mar. 28, 1991

Related U.S. Application Data

[63] Continuation-in-part of Ser. No. 571,083, Aug. 22, 1990, abandoned.

[51] Int. Cl.$^5$ .................... C08B 30/00; A23L 1/10; A23P 1/02
[52] U.S. Cl. .................... 127/67; 426/622; 426/483; 426/482; 426/481
[58] Field of Search .................... 127/67; 426/622, 653, 426/425, 478, 481, 482

[56] References Cited

U.S. PATENT DOCUMENTS

| | | | |
|---|---|---|---|
| 2,797,212 | 6/1957 | Miley et al. | 426/653 |
| 4,604,289 | 8/1986 | Spanier et al. | 426/19 |
| 4,741,913 | 5/1988 | Satake | 426/622 |
| 5,104,671 | 4/1992 | Wellman | 426/622 |

OTHER PUBLICATIONS

Roy L. Whistler, et al, Starch: Chemistry and Technology, 1984, Academic Press, Inc., pp. 491–503.

Primary Examiner—Theodore Morris
Assistant Examiner—P. L. Hailey
Attorney, Agent, or Firm—Hovey, Williams, Timmons & Collins

[57] ABSTRACT

A low cost process for the high yield recovery of wheat gluten and starch is provided which comprises initially pearling whole wheat kernels to remove germ and a part of the bran, followed by grinding to an average particle size of 100–400 microns. The ground, pearled wheat is then subjected to wet processing to isolate gluten and starch. Yields of gluten are 20–25% higher than yields using flour as a starting material.

4 Claims, 2 Drawing Sheets

PARTICAL SIZE DISTRIBUTION OF RAW MATERIAL FOR WET PROCESS PHASE

LOAF VOLUME RESPONSE OF DIFFERENT GLUTEN SOURCES CALCULATED ON A 15.9% ISOPROTEIN LEVEL IN FLOUR, (DB)

1 = BLANK, NO GLUTEN ADDED; 2,3 = COMMERCIAL GLUTENS; 4 = FLOUR-DERIVED GLUTEN; 5 = GLUTEN DERIVED FROM GROUND, PEARLED WHEAT.
* DIFFERENT LETTERS INDICATE A STATISTICALLY SIGNIFICANT DIFFERENCE AT P = 0.05 LEVEL.

PROCESS FOR DRY MILLING OF WHEAT TO OBTAIN GLUTEN AND STARCH

This application is a Continuation-in-Part of "Process For Dry Milling of Wheat To Obtain Gluten and Starch", application Ser. No. 07/571,083, filed Agu. 22, 1990, now abandoned.

BACKGROUND OF THE INVENTION

1. Field of the Invention

The present invention is broadly concerned with an improved method for obtaining starch and gluten in high yield from wheat. More particularly, it is concerned with such a method wherein starting wheat is first pearled to remove germ and bran, whereupon the pearled wheat is ground to a desired average particle size; such dry milled wheat is then subjected to wet processing in order to isolate starch and gluten fractions. Use of ground, pearled wheat results in yields of gluten on the order of 20-25% higher than obtained through the use of flour.

2. Description of the Prior Art

Of all the cereal grains, wheat is produced in largest tonnage around the world. Wheat is most often dry-milled into farina, flour, germ and bran, and those commodities are converted into food or feed. Dry-milled products are mixtures of proteins, carbohydrates, lipids, phenolics, and fiber, and their mixed composition limits their conversion to modified products. Wet-processing of wheat provides end products of singular composition, such as protein, starch, and oil. Wet-processed products from wheat, or their modified forms, may find increased use in foods, textiles, paper, and specialty products.

The two major starting materials for wet processing are the whole wheat kernel or wheat flour. Most manufacturers of gluten and starch begin with flour. If the endosperm represents 83% of the kernel, the commercial extraction of 72% flour is 11% short of ideal, and the difference is the peripheral endosperm that is high in protein. Also, milling damages some starch in the hard wheat flour.

Ideally, wheat gluten and starch would be produced starting with whole wheat kernels. Several processes have been proposed. In one process, tempered wheat is flaked and mixed into a tough hydrated dough. High-pressure water is used to wash the starch, bran and germ from the developed gluten, and then the bran and germ are screened from the starch slurry. In another process, spring hard wheat is steeped 8 hours and gently macerated mechanically to remove bran and germ from the endosperm. The endosperm then undergoes conventional processing to separate gluten and a low-grade flour. Neither of those methods are used today, probably due to high drying costs of low-value streams and/or to difficulties in obtaining high quality gluten.

There is accordingly a need in the art for an improved method for obtaining starch and gluten using whole wheat kernels as a starting material, while at the same time lowering processing costs.

SUMMARY OF THE INVENTION

The present invention overcomes the problems outlined above, and provides a process involving both dry milling and wet processing to obtain increased yields of gluten and starch from wheat kernels at significantly reduced costs. Broadly speaking, the method of the invention comprises pearling of starting wheat kernels to remove at least a portion of the germ and bran fractions therefrom, followed by grinding of the pearled wheat to a desired average particle size, typically in the range of from about 100-400 microns. The ground, pearled wheat is then subjected to wet processing in order to separate starch and gluten fractions. Such wet processing preferably comprises mixing the pearled, ground wheat with water, isolating the gluten fraction from the water, sieving the water to remove residual bran therefrom while forming a filtrate, and centrifuging the filtrate to isolate the desired starch fraction.

Baking tests employing the gluten recovered in accordance with the invention demonstrate that the product is essentially equivalent to conventional, commercially available gluten in terms of increasing loaf volumes.

DESCRIPTION OF THE PREFERRED EMBODIMENTS

The dry milling phase of the process of the invention advantageously comprises the steps of taking whole kernel wheat (e.g., hard red winter wheat), and subjecting this wheat to a tempering and pearling operation. As those skilled in the art will appreciate, tempering involves addition of water followed by a time of laying while pearling involves abrading the kernels in order to remove at least a portion of the germ and bran fractions therefrom. In the context of the present invention, the pearling steps should be carried out for removing at least about 90% by weight of the total germ fraction of the wheat, and more preferably at least about 95% by weight thereof. Similarly, the pearling step should be conducted so as to remove at least about 30% by weight of the total bran fraction of the wheat, and more preferably at least about 60% by weight thereof. Commercially available pearling devices can be used to effect treatment of this character. Insofar as the initial tempering step is concerned, this should preferably be carried out so as to achieve a final moisture content in the wheat prior to pearling of from about 11% to 13% by weight, and more preferably about 12% by weight.

After pearling, the wheat is ground to a desired average particle size. This average size typically ranges from about 100-400 microns, and more preferably from about 150-250 microns. It has been found that if the particle size is too large, then problems occurred during subsequent mixing of doughs prior to gluten washing. On the other hand, too small an average particle size tends to give excessive starch damage.

The ground, pearled wheat has been found to be an ideal starting material for wet processing to obtain starch and gluten fractions. Such wet processing typically involves initially mixing the ground, pearled wheat with water to form a dough having a total moisture content of from about 42% to 48% by weight, whereupon the dough is soaked in additional water.

Gluten is isolated from the dough by hand washing with excess water, and can be recovered by freeze-drying. The liquid washings are thereafter combined and sieved to collect gluten scraps and residual bran and germ, while forming a filtrate. This filtrate may then be centrifuged to separate the desired starch fraction.

Figure 1:
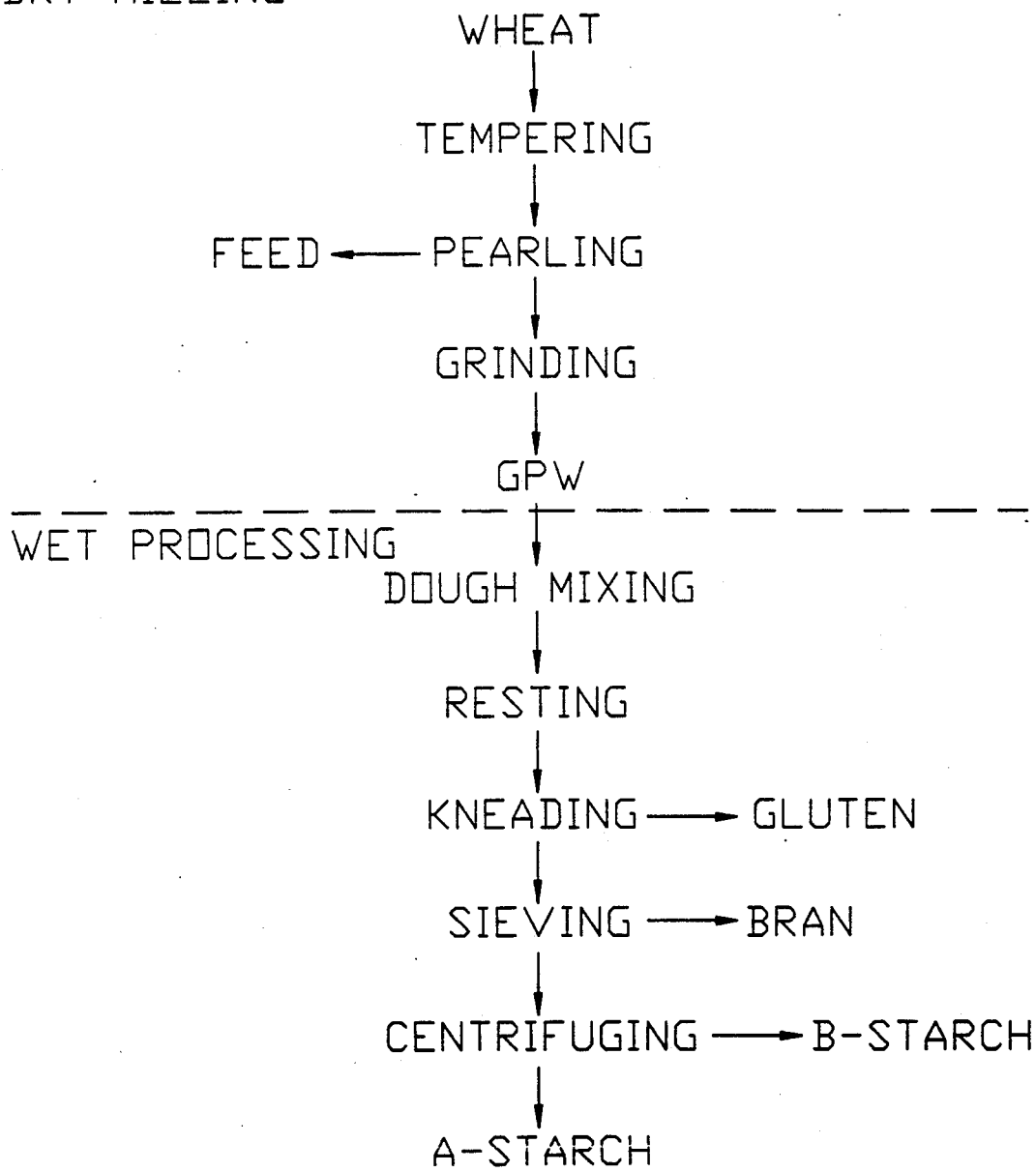
FIG. 1 is a schematic flow diagram setting forth the preferred steps of the dry milling/wet processing method of the invention.

FIG. 1 schematically depicts the preferred processing steps of the invention.

The following examples set forth preferred processing techniques in accordance with the invention. It should be understood, however, that the examples are to be taken as illustrative only and nothing therein should be considered as a limitation upon the overall scope of the invention.

EXAMPLE

This example describes the preferred method of isolating gluten and starch using the combined dry and wet milling process of the invention. In addition, the processes and products of the invention are compared with conventional techniques and products. All mentioned references are incorporated by reference herein.

In this series of tests, Norkan hard red winter wheat (1988 crops) was used for the comparative process. Baking flour was obtained from a local mill, and two commercial samples of vital wheat gluten were obtained, one from a domestic source and the other from Australia. Moisture, protein and ash were assayed by AACC Methods 44-15A, 46-13 and 08-01, respectively. Starch content was determined according to the method described by Chiang and Johnson, "Measurement of Total and Gelatinized Starch by Glucoamylase and O-Toluidine Reagent" *Cereal Chem.*, 54:429 (1977). Flour and starch color were determined on dry powders using an M500 agtron reflectance instrument in the green mode. The instrument was calibrated using disks nos. 68 and 97. Particle sizes were determined by ASAE Method S319.1.

The starting hard red winter wheat was first divided into two samples. One sample was tempered to 16% by weight moisture overnight and then subjected to conventional flour milling (13 steps) using a Ross experimental mill as described by Liu et al., "A Technique to Improve Functionality of Flour from Sprouted Wheat", *Cereal Foods World*, 31:471 (1986). The remaining sample was tempered overnight to 12% by weight moisture and then pearled with a Strong Scott Laboratory Pearler equipped with a No. 30 grit stone and a 10-mesh screen (Tyler code "Figor"). A 50 gram bath of wheat sample required 40 seconds to pearl.

The pearled wheat was then ground (Ross experimental mill) with one pass through a break roll (16 corrugations/inch) and two passes through a smooth roll. The optimum average particle size of about 200 microns for subsequent wet-processing of ground, pearled wheat was produced using a break roll gap of 0.02 inches and a smooth roll gap of 0.003 inches.

All wet-milling procedures were carried out in triplicate. 250 gram samples of ground, pearled wheat or flour were mixed with water in a Hobart mixer for one minute with a paddle plus three minutes with a dough hook. The respective dough samples were then soaked in one liter of water, and the gluten was isolated from the dough by hand washing with a total of nine liters of water. Gluten was recovered by freeze-drying (AACC Method 38-10). The liquid washings were combined and passed through a No. 10 Tyler sieve (1.7 mm openings) to collect gluten scraps, and then through a Nitex Hc 7-118 sieve cloth (118 micron openings) to collect residual bran and germ. The filtrate was centrifuged at 1,300 rpm for 15 minutes, and the sediment was collected as the starch fraction. The supernatant was discarded.

The dark top layer (B-starch) of the sediment was separated with a spatula from the white bottom layer (A-starch), with the latter being washed with water and centrifuged again. The dark top layer of B-starch was removed and combined with the initially recovered B-starch. All the starch fractions and bran were air-dried at room temperature with the aid of a fan. The dried gluten, A- and B-starch, and bran samples were crushed using a mortar and pestle, and then ground through a UDY cyclone sample mill.

Absorption and mixing times for mixtures of bread flour and gluten were determined using a mixograph (AACC Method 54-40A), and breadmaking was performed using pup loaves (AACC Method 10-10B). In each test load, a three gram gluten sample was blended with 100 grams of flour at a 14% moisture basis prior to mixing the dough. Loaf volumes were measured on bread immediately out of the oven, and volumes were corrected to an iso-protein basis using the regression line of Finney, "Experimental Breadmaking Studies, Functional (Breadmaking) Properties, and Related Gluten Protein Fractions", *Cereal Foods World*, 30(11): 794 (1985).

The hard red winter wheat used in these tests contained 16.4% protein on a dry matter basis (Table I), which is equivalent to a 14.7% protein level on a 14% moisture basis. That level of protein is above the yearly average protein level of 12% for hard red winter wheat produced in the Great Plains.

The pearled wheat represented 88–89% of the original weight after removal of the germ and part of bran, while the flour from conventional milling was 68–70% of the wheat weight (Table II). Thus, an increased proportion of the wheat kernel was wet-processed starting with ground pearled wheat. Furthermore, the ground pearled wheat contained 7.3% less damaged starch than the straight-grade flour (Table I). Even though the pearled wheat was 1.2% higher in protein, the increase was attributed to endosperm outer layers.

After pearling, the pearled wheat was ground to an optimum particle-size for wet-processing. It was found that if the particles of endosperm were too large, protein development was inefficient in the dough mixing step. On the other hand, fine grinding by roller milling gave excessive starch damage.

Figure 2:
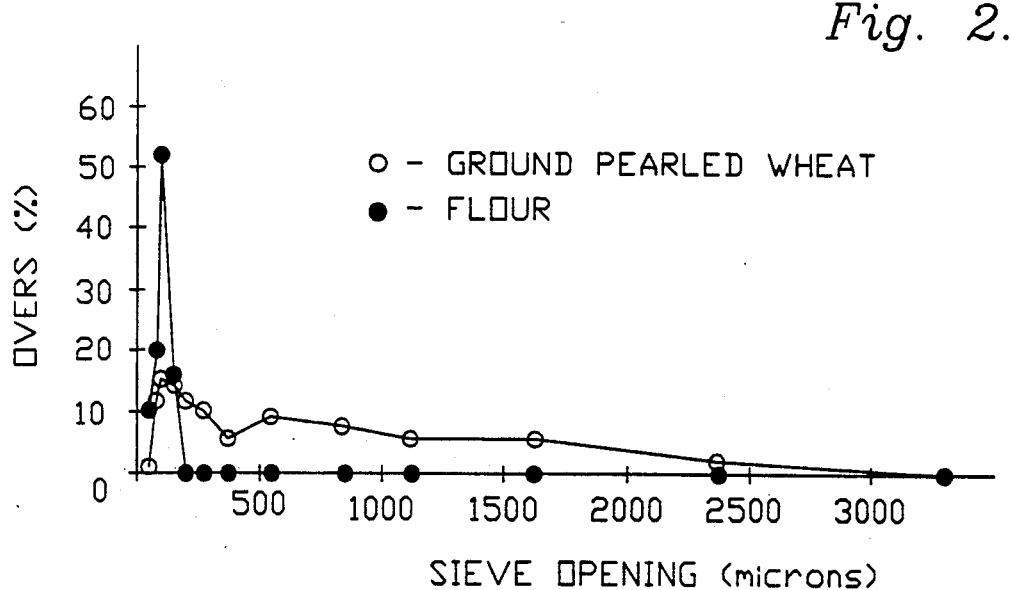
FIG. 2 is a graph setting forth comparative particle size distributions of raw materials subjected to wet processing in accordance with the invention.

Optimum yields of gluten and starch were obtained when the ground, pearled wheat had an average particle size of about 200 microns. The average particle size in such ground pearled wheat was larger than that in flour (FIG. 2), and the damaged starch in ground pearled wheat was much lower.

Preparation of the ground pearled wheat required the 1 pearling and 2 grinding steps, while the conventional flour milling involved a total of 13 grinding and sieving steps. It is estimated that the dry milling cost to produce flour would be three times higher for the conventional flour system as compared with that for ground pearled wheat.

The amount of water needed to form a dough was slightly higher for ground pearled wheat than flour. Wet-processing of ground pearled wheat vs. that of flour gave a 2.5% higher yield of gluten, based on the weight of wheat kernels, and 4.2% more B-starch. The yields of A-starch were practically the same (Table II), and so were their purities (Table III). Approximately 13% more of the protein available in the wheat kernel was isolated starting with ground pearled wheat rather than flour.

Gluten isolated from the two starting materials had the same protein and starch content within experimental error, but differed in ash content by 0.9% (Table III). The gluten was sensitive to oxidation and its color varied with the time it was stored in the freezer before drying. When the storage times of the frozen gluten samples were kept constant, no differences in gluten color were observed for the ground pearled wheat vs. flour starting materials.

The yield of total starch starting from ground pearled wheat was about 12% higher based on wheat than that from flour. However, the B-starch from ground pearled wheat was contaminated with extra bran as indicated by its two-fold higher level of ash and protein compared to the B-starch from flour.

The total solids unaccounted for in the wet processes were 7.1% for the ground pearled wheat and 5.3% for the flour system.

Figure 3:
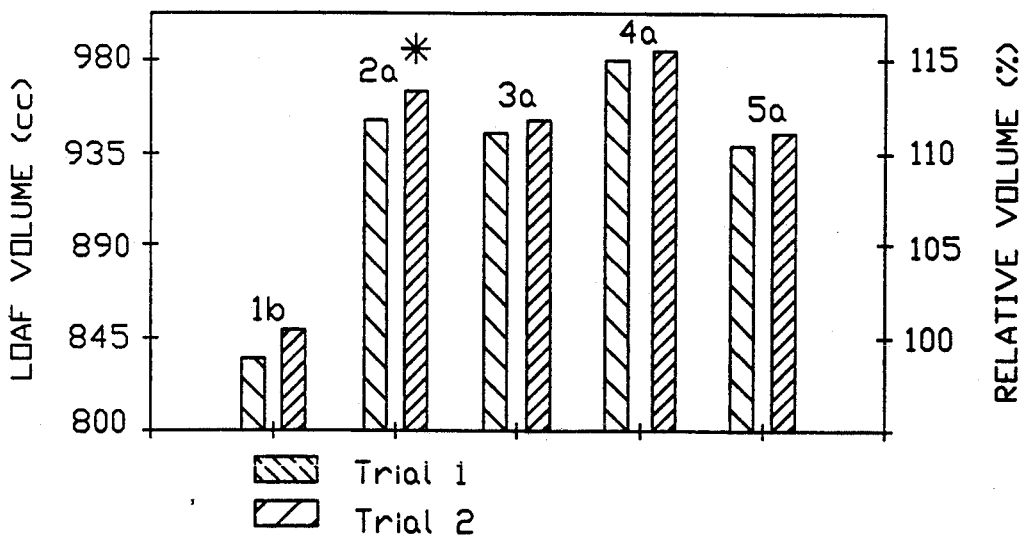
FIG. 3 is a graph setting forth comparative loaf volume increases using gluten prepared in accordance with the invention versus conventional glutens.

All gluten samples increased loaf volume in breadmaking (FIG. 3) when added at a 3% level to a flour with an initial protein level of 13.2% (dry basis). When the loaf volumes were normalized to an isoprotein basis of 15.9% (dry basis) in the flour the gluten isolated from ground pearled wheat gave slightly less improvement in loaf volume than the gluten from flour (FIG. 3). However, the two gluten samples gave identical dough absorptions, mixing times, and crumb grain in the baked bread. The two commercial gluten samples were equal to ground pearled wheat gluten in improving the performance of the flour. This result is somewhat surprising, since commercial gluten usually has approximately 60% efficiency compared to freeze-dried gluten.

The foregoing tests demonstrate that ground pearled wheat is a better starting material than straight-grade flour to wet-process into gluten and starch. The dry milling steps to obtain ground pearled wheat are simpler and less costly as compared to wheat flour milling and a higher yield of gluten protein is obtained from ground pearled wheat. The loaf volume potential of the gluten from ground pearled wheat was almost the same as that from wheat flour. Ground pearled wheat also gave the same yield and purity of A-starch as wheat flour.

TABLE I

COMPOSITION OF RAW MATERIALS (DRY MATTER BASIS)

| Sample | Component | Level, % |
|---|---|---|
| Wheat | Protein | 16.4 ± 0.3 |
|  | Starch | 65.3 ± 1.3 |
|  | Ash | 1.9 ± 0.1 |
| Ground Pearled Wheat | Protein | 15.2 ± 0.3 |
|  | Starch | 68.9 ± 0.8 |
|  | Damaged Starch | 1.0 ± 0.2 |
|  | Ash | 1.6 ± 0.3 |
| Flour | Protein | 14.0 ± 0.2 |
|  | Starch | 79.7 ± 1.3 |

TABLE I-continued

COMPOSITION OF RAW MATERIALS (DRY MATTER BASIS)

| Sample | Component | Level, % |
|---|---|---|
|  | Damaged Starch | 8.3 ± 0.1 |
|  | Ash | 0.4 ± 0.1 |

TABLE II

PRODUCT YIELD (kg) FROM 100 KILOGRAM OF WHEAT (DRY MATTER BASIS)

| Product | Ground Pearled Wheat | Flour System |
|---|---|---|
| Dry milled |  |  |
| Germ and bran | 11.4 ± 0.5 | 30.0 ± 1.0 |
| Endosperm | 88.5 ± 0.5 | 70.0 ± 1.0 |
| Wet processed |  |  |
| Bran | 10.3 ± 0.5 | 0.4 ± 0.1 |
| Gluten | 13.2 ± 0.9$^a$ | 10.7 ± 0.8$^b$ |
| Starch A | 32.1 ± 0.3$^a$ | 32.1 ± 0.5$^a$ |
| Starch B | 25.8 ± 0.3$^a$ | 21.6 ± 1.2$^b$ |
| Losses (by difference) | 7.1 | 5.3 |

$^a$Different letters indicate a significant difference at p = 0.05 level.

TABLE III

COMPOSITION (% BY WEIGHT) OF PRODUCTS ISOLATED STARTING FROM GROUND PEARLED WHEAT AND FLOUR (DRY MATTER BASIS)

| | Starting Material | |
|---|---|---|
| Component | Ground Pearled Wheat | Flour |
| Bran |  |  |
| Protein | 13.9 ± 0.3 | — |
| Ash | 4.5 ± 0.1 | — |
| Gluten |  |  |
| Protein | 75.2 ± 2.0$^a$ | 76.4 ± 2.0$^a$ |
| Starch | 7.3 ± 0.5$^a$ | 7.1 ± 0.3$^a$ |
| Ash | 1.3 ± 0.1$^a$ | 0.4 ± 0.1$^b$ |
| Color | 44.3 ± 3.8$^a$ | 44.3 ± 2.9$^a$ |
| A-Starch |  |  |
| Protein | 0.6 ± 0.1$^a$ | 0.6 ± 0.1$^a$ |
| Starch | 94.3 ± 1.0$^a$ | 96.0 ± 2.4$^a$ |
| Ash | 0.2 ± 0.1$^a$ | 0.1 ± 0.1$^a$ |
| Color | 90.2 ± 2.3$^a$ | 92.0 ± 2.3$^a$ |
| B-Starch |  |  |
| Protein | 1.6 ± 0.2$^a$ | 0.9 ± 0.2$^b$ |
| Starch | 82.5 ± 2.1$^a$ | 83.2 ± 2.2$^a$ |
| Ash | 0.4 ± 0.1$^a$ | 0.2 ± 0.1$^a$ |
| Color | 69.4 ± 2.0$^a$ | 69.3 ± 1.8$^a$ |

$^{a,b}$Different letters indicate a significant difference at P = 0.05 level.

An additional study was undertaken to demonstrate optimum particle size for the ground pearled wheat, in terms of maximized gluten and starch recovery. Pearled wheat was ground using one corrugated break roll and one smooth middling roll at different gap settings. The ground pearled wheat with different granulations were then wet processed and the results compared to conventionally milled flour (approximately 70% extraction). The results of this test are set forth in Table IV, and demonstrate that maximum gluten and starch recovery is obtained at the level of about 150–250 microns average particle size.

TABLE IV

EFFECT OF PARTICLE SIZE ON ISOLATION OF GLUTEN AND STARCH FROM GROUND PEARLED WHEAT COMPARED WITH WHEAT FLOUR

| Starting Material | A | B | C | D | E | F |
|---|---|---|---|---|---|---|
| Processing Step(s) | 1B | 1B | 1B/1M | 1B/1M | 1B/1M/2M | — |
| Average Particle Size (Microns) | 660 | 775 | 347 | 174 | 109 | 78 |

TABLE IV-continued
EFFECT OF PARTICLE SIZE ON ISOLATION OF GLUTEN AND STARCH FROM GROUND PEARLED WHEAT COMPARED WITH WHEAT FLOUR

| Starting Material | A | B | C | D | E | F |
|---|---|---|---|---|---|---|
| % Yield, based upon wheat weight | | | | | | |
| Gluten | 9.7 | 7.9 | 10.1 | 9.3 | 10.2 | 7.4 |
| Total Starch | 50.0 | 54.4 | 57.3 | 59.0 | 57.2 | 55.5 |
| Recovery of Components in Gluten, % | | | | | | |
| Protein | 57.8 | 57.1 | 71.5 | 76.3 | 68.5 | 70.4 |
| Ash | 0.8 | 0.9 | 1.3 | 1.4 | 1.7 | 0.5 |
| % Solids Lost | 14.1 | 11.3 | 9.9 | 9.6 | 11.2 | 7.1 |

A = unpearled hard red winter wheat
B,C,D,E = pearled hard red winter wheat (11% of starting wheat separated as bran and germ)
F = hard red winter wheat flour
1B = 1 break roll treatment, 0.02 inch clearance
1M = 1 middling roll treatment, 0.003 inch clearance

We claim:
1. A method of obtaining starch and gluten fractions from wheat, comprising the steps of:
providing a quantity of wheat;
pearling said quantity of wheat to remove at least about 90% by weight of the total germ fraction of said wheat and at least about 30% by weight of the total bran fraction of the wheat, and separating said removed germ and bran fractions from the pearled wheat;
grinding the pearled wheat in the absence of said removed germ and bran fractions to an average particle size of from about 100 to 400 microns; and
isolating said starch and gluten fractions from said pearled, ground wheat.

2. The method of claim 1, said pearling step comprising the step of abrading said wheat.

3. The method of claim 1, said average particle size being from about 150–250 microns.

4. The method of claim 1, said isolating step comprising the steps of mixing said pearled, ground wheat with water, isolating said gluten fraction from said water, sieving said water to remove residual bran therefrom and form a filtrate, and centrifuging said filtrate to isolate said starch fraction.

* * * * *